United States Patent Office 3,240,756
Patented Mar. 15, 1966

3,240,756
CONTINUOUS ADDITION OF PHENOLIC CHAIN TERMINATOR IN BISPHENOL POLYCARBONATE PRODUCTION BY EMULSION POLYMERIZATION
Rudolph D. Deanin, West Hartford Township, Hartford County, Conn., and Ann V. Pinter, Morristown, N.J., assignors to Allied Chemical Corporation, New York, N.Y., a corporation of New York
No Drawing. Filed Mar. 2, 1961, Ser. No. 92,746
5 Claims. (Cl. 260—47)

This invention relates to a procedure for employing phenol chain terminators to control the molecular weight of bisphenol polycarbonates obtained by reacting with phosgene a bisphenol alkane, cycloalkane or aralkane, or their derivatives containing halogen attached to carbon in an aromatic ring, to form a polycarbonate. The term "bisphenol alkane" will be used in this specification to designate the several bisphenol alkanes, cycloalkanes and aralkanes and their derivatives which contain halogen attached to carbon in an aromatic ring.

It is known to prepare a mixture of a bisphenol, an aqueous caustic alkali solution, an organic solvent for phosgene in which the polycarbonates of the bisphenol are soluble and a catalyst promoting the growth in molecular weight of the polycarbonate. A quaternary ammonium base or a tertiary amine is commonly used as this catalyst. The bisphenol may or may not all be in solution in the aqueous caustic alkali in the form of the alkali metal salt of the bispenhol. Phosgene gas is introduced into this mixture to form the carbonate and polycarbonate of the bisphenol, and it is customary after completion of the introduction of the phosgene to agitate the reaction mixture for a period of time to permit growth of the low molecular weight polycarbonate present to a desired higher molecular weight.

Extremely high molecular weight polycarbonates of the bisphenols can thus be obtained. For most purposes for which the product is to be used, however, it is desirable to be able to stop the growth in molecular weight at reasonably definite average molecular weights, and to be able to do this consistently in repeatedly carrying out the process. Accordingly, it has been proposed to include in the mixture which is to be phosgeneated a chain terminating material, which, by reaction with the terminal radicals of the growing polycarbonate chains, serves to limit their growth. As such chain terminators it is known to employ monohydroxy phenols, phenol itself or substituted phenols such as p-tertiary butyl phenol, cyclohexy phenol, and 2,2-(4-hydroxy phenyl-4'-methoxy phenyl)-propane.

Phenols in general, however, also react with the catalysts which are effective to promote the growth in molecular weight of the polycarbonates. Particularly when relatively high concentrations of catalyst are present, about 1 mole precent or more of the catalyst by weight of the disphenol present, much of the phenol added is wasted by reaction with the catalyst and uniform, reproducible control of the growth in molecular weight of the polycarbonate products is not obtained. If, in order to obtain satisfactory control of the molecular weight, lower concentrations of the catalyst are employed, longer reaction periods or higher temperatures or both are required to obtain polycarbonates of a given molecular weight.

We have now found that by introducing into the reaction mixture containing a bisphenol alkane, aqueous caustic alkali, solvent and catalyst, the monohydroxy phenol chain terminator simultaneously with the introduction of the phosgene over the period during which the phosgene is introduced, good control in the growth in molecular weight of the polycarbonate to desired size can be obtained and the desired molecular weights are reproducible by maintaining uniformity in composition of the reaction mixtures and reaction conditions. This control is obtained even in the presence of high concentrations of catalyst.

In operating in accordance with our invention the known procedures for producing a polycarbonate by phosgenating a mixture of a bisphenol, aqueous caustic alkali solution and an organic solvent for the phosgene and the polycarbonate product can be employed. Any of the known monohydroxy phenol chain terminators for the bisphenol polycarbonates can be employed in our process to effectively limit the growth in molecular weight of the polycarbonate product. Our invention is characterized by introducing into the mixture of bisphenol alkane, aqueous caustic alkali solution, catalyst and solvent for phosgene and the polycarbonate, the monohydroxy phenol chain terminator simultaneously with introduction of the phosgene and the chain terminator is introduced at about the same rate, in percent of total weight per unit time, as the phosgene.

This control of the molecular weight can be obtained in those processes for making the polycarbonates of the bisphenol alkanes having the structure

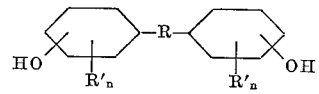

in which R is a divalent alkane, cycloalkane or aralkane radical containing only aromatic unsaturation, R' is a monovalent alkane radical and $n$ is an integer from 0 to 4, and the derivatives of those bisphenols which contain halogen attached to carbon in an aromatic ring. The bisphenols having the above structure in which each of the two hydroxyl groups is in the 4-position of a phenylene radical and are linked through phenylene radicals, each pair of which is linked through a single carbon atom of a divalent alkane radical, and their derivatives containing halogen attached to carbon in an aromatic ring, are the preferred bisphenols for production of polycarbonates in accordance with our invention.

Examples of those bisphenols from which their polycarbonates can be prepared in the foregoing manners and the molecular weights of the polycarbonates can be controlled by operating in accordance with our invention, are:

2,2-bis(4-hydroxyphenyl) propane (also known as bisphenol-A),
Bis(4-hydroxyphenyl) methane,
1,1-bis(4-hydroxyphenyl) cyclohexane,
1,1-bis(4-hydroxy-3-methylphenyl) cyclohexane,
2,2-bis(2-hydroxy-4-tert-butylphenyl) propane,
3,4-bis(4-hydroxyphenyl) hexane,
1,1-bis(4-hydroxyphenyl)-1-phenyl ethane,
2,2-bis(4-hydroxyphenyl) butane,
2,2-bis(4-hydroxyphenyl) pentane,
3,3-bis(4-hydroxyphenyl) pentane,
2,2-bis(4-hydroxyphenyl)-3-methyl butane,
2,2-bis(4-hydroxyphenyl) hexane,
2,2-bis(4-hydroxyphenyl)-4-methyl pentane,
2,2-bis(4-hydroxyphenyl) heptane,
4,4-bis(4-hydroxyphenyl) heptane, and
2,2-bis(4-hydroxyphenyl) tridecane, as well as the halogen derivatives of those bisphenols, e.g., 2,2-bis(4-hydroxy-3-chlorophenyl) propane and
2,2-bis(4-hydroxy-3,5-dibromophenyl) propane.

Mixtures of 2 or more of these bisphenols can also be employed for producing mixed polycarbonates in accordance with our invention.

In our preferred processes the catalyst amounts to about 0.1 to about 2.2 mole percent of the bisphenol to obtain rapid growth of the polycarbonate to the desired molecular weight at low temperatures of about 10° C. to about 50° C. and during phosgenation of the reaction mixture the chain terminator introduced amounts to about 1.5 to about 5.0 mole percent of the bisphenol. However, the composition of the reaction mixture and reaction conditions as well as the amount of the chain terminator introduced influence the molecular weight of the polycarbonate product, and the desired molecular weight may differ depending upon the particular use to which the polycarbonate product is to be put. Accordingly, the amount of the chain terminator can be varied to include amounts outside those limits, but will be a small mole percentage of the bisphenol present which is effective to limit the molecular weight of the product to a lower molecular weight than that produced by the same process in the absence of the chain terminator.

The polycarbonates of bisphenol-A having molecular weights ranging from about 10,000 to about 30,000 have properties making them suitable for most uses for the polycarbonates of the bisphenol alkanes and their halogenated derivatives, such as in the production of molded products or coating compositions. Our invention, therefore, will be more completely described and illustrated in the following examples of the production of polycarbonates of bisphenol-A. The molecular weights given are those calculated from the effluent times of an 0.1% solution of the polycarbonate in ethylene chloride and of the ethylene chloride solvent measured in an Ostwald-Fenske viscometer at 25° C., using the following equations:

$$N_r = \frac{\frac{T}{T'} - 1}{C}$$

$$N_i = N_r - 0.02$$

$$NW^{0.83} = \frac{N_i}{1.23 \times 10^{-4}}$$

In these equations T and T' are the effluent times of the solution of the polycarbonate and of the solvent, respectively, C is the concentration of the polycarbonate in the solution in grams/100 cc. of solvent, and MW is the molecular weight of the polycarbonate. Plotting the values for MW (as ordinates) at various values for $N_i$ (as abscissas) on common log-log graph paper gives a straight line, which was used to read directly the molecular weight.

*Example 1.*—A reaction vessel fitted with a stirrer, thermometer, reflux condenser, dropping funnel and gas inlet tube was charged with 500 cc. water, 31.5 gm. NaOH and 57 gm. bisphenol-A, with a stream of nitrogen gas being passed into the reaction vessel. The mixture was stirred until the caustic soda and bisphenol-A were dissolved in the water. The solution was cooled to room temperature. Ethylene dichloride, 508 cc., was introduced into the reaction vessel. Benzyl triethyl ammonium chloride as catalyst was added as 6.4 cc. of a 10% aqueous solution of this material. This corresponded to 1.13 mole percent of the catalyst by weight of the bisphenol-A. The flow of nitrogen gas was discontinued and phosgene gas, amounting to 27.5 gm. was then bubbled into the stirred material in the vessel and 0.64 gm. of phenol (2.7 mole percent by weight of the bisphenol-A) dissolved in 64 cc. of ethylene dichloride was added to the reaction mixture, both the phosgene gas and the solution of phenol being introduced at uniform rates over a period of one hour. The reaction mixture was cooled during this period to maintain it at 30° C. Following completion of the addition of the phosgene gas and phenol, the reaction mixture was stirred for an additional 15 minutes to promote growth in molecular weight of the polycarbonate present in solution in the ethylene dichloride. The resulting solution of polycarbonate in ethylene dichloride was separated from the aqueous phase present, washed with dilute hydrochloric acid and then with water. Acetone amounting to 300 cc., followed by 500 cc. of methanol were stirred into the acid and water washed solution to precipitate the polycarbonate. The solid polymer was filtered off and dried in air at 120° C. The dried polycarbonate of bisphenol-A had a molecular weight of 28,000.

Employing the same reaction mixture and procedure as in above Example 1, except for the phenol solution in ethylene dichloride all being introduced into the reaction mixture prior to the introduction of the phosgene gas, the resulting polycarbonate of bisphenol-A had a molecular weight of 86,000.

*Examples 2–7.*—The same equipment and procedure employed in Example 1 above was employed with the following exceptions; the aqueous caustic soda solution contained 35.7 gm. NaOH, 500 cc. of methylene dichloride were employed as solvent for the phosgene and polycarbonate, and the stated amount of phenol as a 1% solution in methylene chloride was added to each reaction mixture at a uniform rate over a one hour period during which 30 gm. of phosgene were bubbled into the reaction mixture. Following the introduction of the phosgene gas the reaction mixture was stirred for an additional one hour period at 30° C.

The following table shows for these several examples the amount of phenol introduced into the reaction mixture in mole percent of the bisphenol-A, and the molecular weights of the resulting polycarbonate products.

TABLE I

| Example | Mole Percent Phenol | Mol. Wt. of Polycarbonate |
|---|---|---|
| 2 | 1.35 | 50,000 |
| 3 | 2.70 | 25,000 |
| 4 | 3.00 | 23,000 |
| 5 | 3.38 | 21,000 |
| 6 | 3.87 | 16,000 |
| 7 | 4.51 | 14,000 |

In the following Table II the molecular weights are given of polycarbonates produced by the procedure of Examples 2–7 but with the stated amounts of phenol in solution in the methylene dichloride being added to the reaction mixture before introduction of the phosgene and none during the phosgenation.

TABLE II

| Mole Percent Phenol | Mol. Wt. of Polycarbonate |
|---|---|
| 0.000 | 50,000 |
| 0.27 | 57,000 |
| 2.70 | 53,000 |
| 8.10 | 59,000 |

The data of Tables I and II show that by introducing the phenol chain terminator over the phosgenation period, the molecular weight of the resulting product varies inversely with respect to the mole percent of chain terminator employed. Employing at least about 1.5 mole percent phenol (by weight of the bisphenol present) as chain terminator under the conditions of Examples 2–7, polycarbonate products can be produced with any desired lower molecular weight than those obtained with no chain terminator present by varying the amounts of chain terminator introduced during the phosgene period in operating in accordance with our invention. On the other hand, if the chain terminator is introduced before phosgenation, as heretofore was customary, the bisphenol polycarbonates have substantially the same or even higher molecular weights than with no chain terminator and there is no consistent relationship between the molecular weights of the products and the amount of phenol chain terminator used.

Other monohydroxy phenols, such as orthocresol, orthophenyl-phenol, p-benzyl phenol, nonyl phenol, beta-naphthol and p-methoxy phenol can be substituted for the phenol used in the above examples to control the molecular weight of the polycarbonate products.

We claim:
1. In a process for the production of a polycarbonate of a bisphenol by introducing phosgene into a mixture of (1) a member of the group consisting of the bisphenols having the structure

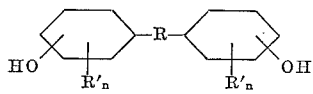

in which R is a member of the group consisting of the divalent alkane, cycloalkane and aralkane radicals containing only aromatic unsaturation, R' is a monovalent alkane radical and $n$ is an integer from 0 to 4, and the halogenated derivatives of those bisphenols which contain the halogen attached to carbon in an aromatic ring, (2) an aqueous caustic alkali solution, (3) an organic solvent for the phosgene in which the polycarbonate product is soluble, (4) a catalyst promoting growth in molecular weight of the polycarbonate selected from the group consisting of quaternary ammonium bases and tertiary amines, and (5) a monohydroxy phenol chain terminator to control that growth in molecular weight, that improvement which comprises introducing said chain terminator into a mixture of said bisphenol, caustic alkali solution, organic solvent and catalyst simultaneously with and at about the same rate, in percent of total weight per unit of time, as the introduction thereinto of the phosgene, said chain terminator amounting to a small mole percentage of the bisphenol present which is effective to limit the molecular weight of the polycarbonate product to a lower molecular weight than that produced by the same process in the absence of the chain terminator.

2. The process of claim 1 in which the catalyst is present in amounts of about 0.1 to about 2.2 mole percent and the monohydroxy phenol chain terminator amounts to about 1.5 to about 5.0 mole percent of the bisphenol.

3. The process of claim 1 in which the bisphenol is 4,4'-dihydroxydiphenyl-2,2-propane.

4. The process of claim 2 in which the bisphenol is 4,4'-dihydroxydiphenyl-2,2-propane.

5. The process of claim 1 in which the catalyst is present in amounts of about 1.0 to about 2.2 mole percent of the bisphenol.

References Cited by the Examiner

UNITED STATES PATENTS

| | | | |
|---|---|---|---|
| 2,970,131 | 1/1961 | Moyer | 260—47 |
| 3,026,298 | 3/1962 | Lee | 260—47 |
| 3,028,365 | 4/1962 | Schnell | 260—47 |

OTHER REFERENCES

Christopher, Polycarbonates, Reinhold Publishing, pages 17–18 (1962).

WILLIAM H. SHORT, *Primary Examiner.*

HAROLD N. BURSTEIN, *Examiner.*